United States Patent [19]

Facci et al.

[11] Patent Number: 5,258,461

[45] Date of Patent: Nov. 2, 1993

[54] ELECTROCODEPOSITION OF POLYMER BLENDS FOR PHOTORECEPTOR SUBSTRATES

[75] Inventors: John S. Facci, Webster; Ronald E. Jansen; David H. Pan, both of Rochester; William G. Herbert, Williamson; Donald S. Sypula; Joseph Mammino, both of Penfield, all of N.Y.

[73] Assignee: Xerox Corporation, Stamford, Conn.

[21] Appl. No.: 606,846

[22] Filed: Nov. 26, 1990

[51] Int. Cl.$^5$ .................. C08L 27/14; C08L 27/16; C08L 67/02; C08L 69/00

[52] U.S. Cl. .................. 525/165; 525/178; 525/185; 525/186; 525/189; 525/199; 525/420; 525/425; 525/433; 525/436; 525/439; 525/462; 430/270

[58] Field of Search ............ 525/420, 436, 165, 178, 525/185, 186, 189, 199, 420, 425, 433, 436, 439, 462; 430/270

[56] References Cited

U.S. PATENT DOCUMENTS

| | | | |
|---|---|---|---|
| 3,121,006 | 2/1964 | Middleton et al. | 430/31 |
| 3,357,989 | 12/1967 | Byrne et al. | 540/122 |
| 3,442,781 | 5/1969 | Weinberger | 430/32 |
| 3,658,938 | 4/1972 | Kwiatkowski et al. | 525/420 |
| 3,676,308 | 7/1972 | Brown | 205/109 |
| 3,761,371 | 9/1973 | Dickie et al. | 524/521 |
| 3,798,143 | 3/1974 | Rolles et al. | 204/181.6 |
| 3,869,366 | 3/1975 | Suzuki et al. | 524/110 |
| 3,882,188 | 5/1975 | Behmel | 525/443 |
| 3,920,532 | 11/1975 | Hansen et al. | 204/181.4 |
| 3,974,324 | 8/1976 | Lupinski et al. | 525/436 |
| 3,994,994 | 11/1976 | Stolka | 430/72 |
| 4,048,252 | 9/1977 | Behmel | 525/443 |
| 4,066,592 | 1/1978 | Wismer et al. | 525/440 |

(List continued on next page.)

OTHER PUBLICATIONS

"Seamless Conductive Substrate for Electrophotographic Applications"–W. W. Limburg et al–Xerox Disclosure Journal, vol. 14, No. 2, Mar./Apr. '89.

De Paoli et al "Conductive Composites for Poly (vinyl chloride) and Polypyrrole", J. Chem. Soc., Chemm. Commun., 1984, pp. 1015–1016.

De Paoli et al, "An Electrically Conductive Plastic Composite Derived From Polypyrrole and Poly(vinyl Chloride)" J. Poly. Sci., vol. 23, 1687–1698 (1985).

*Primary Examiner*—John Kight, III
*Assistant Examiner*—Rabon Sergent
*Attorney, Agent, or Firm*—Oliff & Berridge

[57] ABSTRACT

Polymer films are formed by electrocodeposition of solutions containing a dispersion of charged particles of a first polymer and charged particles of a second polymer. Microheterogeneous films are obtained having micro-domains of a minor component polymer dispersed in the major component polymer. Processes for preparing dispersions for electrocodeposition are also provided In a first process, two polymers are dissolved in a common solvent and then dispersed as small charged particles in another solvent which is a precipitant for both polymers. In another process, a dispersion of a first polymer is prepared by adding a solution of the first polymer to a dispersant solvent, and then a solution of a second polymer is dispersed in the dispersion of the first polymer. In another process, a solution of the second polymer is added to a dispersion of the first polymer which contains only a single non-solvent for the second polymer. In yet another process, a dispersion of the first polymer in a first solvent system is mixed directly with a dispersion of a second polymer in a second solvent system, resulting in a dispersion of the first and second polymers in a resulting solvent system of the first and second solvent systems. In yet another process, a block copolymer composed of two blocks is dissolved in a solvent, and then dispersed in a non-solvent to form the dispersion.

7 Claims, 5 Drawing Sheets

U.S. PATENT DOCUMENTS

| | | | |
|---|---|---|---|
| 4,286,033 | 8/1981 | Neyhart et al. | 430/58 |
| 4,291,110 | 9/1981 | Lee | 430/59 |
| 4,338,387 | 7/1982 | Hewitt | 430/58 |
| 4,415,639 | 11/1983 | Horgan | 430/57 |
| 4,425,467 | 1/1984 | Alvino et al. | 524/600 |
| 4,447,580 | 5/1984 | Ai et al. | 525/177 |
| 4,474,658 | 10/1984 | Alvino et al. | 524/901 |
| 4,533,448 | 8/1985 | Scala et al. | 524/364 |
| 4,604,412 | 8/1986 | Joh et al. | 525/440 |
| 4,642,170 | 2/1987 | Alvino et al. | 204/181.4 |
| 4,664,768 | 5/1987 | Scala et al. | 428/229 |
| 4,684,674 | 8/1987 | Brooks | 525/420 |
| 4,703,081 | 10/1987 | Blackwell et al. | 525/420 |
| 4,711,926 | 12/1987 | Kojima et al. | 525/162 |
| 4,760,105 | 7/1988 | Fuller et al. | 528/114 |
| 4,766,181 | 8/1988 | Ostrozynski et al. | 525/446 |
| 4,786,565 | 11/1988 | Shirai | 525/129 |
| 4,786,678 | 11/1988 | Dobreski et al. | 525/184 |
| 4,808,473 | 2/1989 | Brooks | 428/336 |
| 5,006,412 | 4/1991 | Hodgson et al. | 525/436 |
| 5,008,318 | 4/1991 | Ishii et al. | 525/165 |
| 5,037,902 | 8/1991 | Harris et al. | 525/436 |
| 5,071,925 | 12/1991 | Rostami | 525/436 |

ELECTROCODEPOSITION OF POLYMER BLENDS FOR PHOTORECEPTOR SUBSTRATES

BACKGROUND OF THE INVENTION

This invention relates in general to polymeric films, and in particular, to seamless polymeric films and to a process for preparing the films as belts for use in an electrophotographic imaging member. The polymeric films of the present invention comprise blends of polymers prepared by electrocodeposition.

Electrophoretic deposition of polymers in solution is a known process for obtaining polymeric films. Typically a dispersion of charged particles is deposited on a surface by application of a voltage or current in an electrodeposition bath. Polymer films obtained by the electrodeposition process may be used for a variety of purposes, such as for use in an electrophotographic imaging member.

A number of electrophotographic imaging members are known which comprise a photoconductive material deposited on a rigid conductive substrate. These imaging members require elaborate, highly sophisticated, and expensive equipment for fabrication. For example, imaging members have been prepared by vacuum depositing selenium alloys onto rigid aluminum substrates. Imaging members have also been prepared by coating rigid substrates with photoconductive particles dispersed in an organic film forming binder. Coating of rigid drum substrates also has been effected by various techniques such as spraying, dip coating, vacuum evaporation, and the like. Rigid drum imaging members, however, limit apparatus design flexibility, are less desirable for flash exposure, and are expensive.

Flexible imaging members are also known. Flexible organic imaging members may be manufactured by coating a web, and thereafter shearing the web into segments which are then formed into belts by welding opposite ends of the sheared web. The resulting welded seam on the imaging member, however, disrupts the continuity of the outer surface of the imaging member and therefore must be indexed so that it does not print out during an imaging cycle. Efficient stream feeding of paper and throughput are thus adversely affected because of the necessity to detect a seam within the length of each sheet of paper. The mechanical and optical devices required for indexing add to the complexity and the cost of copiers, duplicators, and printers, and reduce the flexibility of design. Welded belts are also less desirable for electrophotographic imaging systems because the seam forms a weak point in the belts and collects toner and paper debris during cleaning.

Accordingly, seamless belts suitable as substrates for electrophotographic or ionographic imaging members are particularly desirable. One method of obtaining seamless belts is by electrodeposition.

U.S. Pat. No. 3,676,308 to Brown discloses electrocodeposition of polyvinylidene chloride and copolymer particles with copper. Fine particles of organic resins derived from vinylidene chloride densely codeposit with copper when dispersed in aqueous acidic copper electroplating baths. Two-phase copper coatings having densely embedded resin particles are obtained.

U.S. Pat. No. 3,761,371 to Dickie et al discloses electrodeposition of various coating materials. Particulate elastomers may be mechanically mixed with an electrodepositable carrier resin and electrodeposited. The elastomer electrodeposits as a reaction product with a monomer or low molecular weight prepolymer that provides the reaction product with an ionizable surface functionality.

U.S. Pat. No. 3,798,143 to Rolles et al discloses an electrophoretic deposition of an acrylic interpolymer comprising methacrylate and an acrylic acid on an aluminum substrate from an aqueous colloidal dispersion. The coating is coalesced on the aluminum or anodized aluminum substrate by heating or by a coalescing agent.

U.S. Pat. No. 3,869,366 to Suzuki et al discloses a method of electrocoating which comprises immersing an electrically conductive metallic article in an aqueous electrode deposition bath containing a cationic binder resin and a non-ionic synthetic resin powder dispersed therein. The cationic binder resin is neutralized with an acid compound and the non-ionic synthetic resin powder in the deposition bath.

U.S. Pat. No. 3,920,532 to Hansen et al discloses a process for electrodeposition of a dispersion of finely divided substances in an apolar dispersing agent. The dispersion includes surface-active ion-forming substances which are soluble in a dispersing agent and are dissociable.

U.S. Pat. No. 4,425,467 discloses a method of making a non-aqueous emulsion from which a polymer can be electrodeposited. A mixture is prepared of about 50 to about 150 parts by weight of a non-aqueous organic, non-electrolyzable, non-solvent for the polymer with about 0.8 to about 1.2 parts by weight of a nitrogen-containing base which can be a tertiary amine, an imidazole, or mixture of a tertiary amine and an imidazole. To the mixture is added a solution of 1 part by weight of the polymer which can be a polyamic acid, a polyamide imide, a polyimide, a polyparabanic acid, a polysulfone, or a mixture of these polymers. The polymer is in a non-aqueous, organic, non-electrolyzable aprotic solvent such as N-methyl-2-pyrrolidone.

In addition, "An Electrically Conductive Plastic Composite Derived from Polypyrrole and Poly(vinyl Chloride)", M. De Paoli et al., *Journal of Polymer Science*, Vol. 23, pages 1687 to 1698 (1985), discloses a process for obtaining an electrically conductive plastic material by the electrochemical polymerization of pyrrole in a poly(vinyl chloride) matrix to form a composite wherein the polypyrrole is uniformly distributed in the poly(vinyl chloride) matrix. A film of poly(vinyl chloride) is cast on the surface of an electrode, and the coated electrode is used to generate polypyrrole in the pores of the matrix. Further "Conductive Composites from Poly(vinyl chloride) and Polypyrrole", M. De Paoli et al., *J. Chem. Soc., Chem. Commun.*, pages 1015 and 1016 (1984), discloses a process that entails the electrochemical polymerization of pyrrole on a platinum electrode covered with film of poly(vinyl chloride) to produce a composite polymer film.

William W. Limburg, Santokh S. Badesha, and John S. Facci in "Seamless Conductive Substrate for Electrophotographic Application," Xerox Disclosure Journal, Vol. 14, No. 2 (1989) disclose a conductive substrate comprising an interpenetrating polymer domain network comprising an electrically conductive polypyrrole in a host polymer such as polyvinyl chloride. The interpenetrating network can be prepared by depositing the host polymer on a cylindrical metallic electrode by electrostatic powder or solvent spray processes, followed by immersing the host polymer and the conductive mandrel in a bath containing a solution of pyrrole in an electrolyte solution and anodically electropolymerizing the pyrrole to deposit conductive polypyrrole throughout the void areas of the host polymer. Alternatively, the pyrrole swelled host polymer can be contacted with diethyl selenite to cause the pyrrole to polymerize oxidatively to polypyrrole on contact. Further, an interpenetrating domain network of polypyrrole can be created by diffusing separated solutions of diethyl selenite and pyrrole in a swelling solvent into the host polymer from opposite sides of the film so that oxidative chemical polymerization of pyrrole occurs within the host polymer where the separated solutions intersect.

Although the above-described patents provide methods for electrodepositing various materials, there remains a need for an electrodeposition process which enables the preparation of polymeric compositions with superior mechanical and physical properties. In particular, seamless photoreceptor substrates which are flexible, tough, noncompliant and tear resistant are desirable. However, these substrate properties are difficult to obtain in a pure single component polymeric material. For example, photoreceptor substrate materials, such as polyamideimide, possess many superior mechanical properties except for tear and crack propagation. It is thus desirable to fabricate substrates in which the desired mechanical properties of a polymer may be tailored for individual applications.

SUMMARY OF THE INVENTION

It is an object of the invention to provide improved flexible, free standing polymeric belts, and a process for producing such belts.

It is an object of the invention to provide a process for producing flexible belts wherein the properties of the polymeric film may be tailored.

It is a further object of the invention to provide polymer blends which have superior mechanical properties.

It is an object of the invention to electrocodeposit incompatible polymer blends.

It is an object of the invention to provide microheterogeneous polymer films which comprise microdomains of a guest polymer in a host polymer.

It is also an object of the invention to provide polymeric films which are non-light scattering.

These and other objects of the invention are achieved by providing a dispersion of electrically charged, thermoplastic or thermoset film forming polymer particles in an organic liquid dispersion. The dispersion is formed without a nitrogen-containing base. The polymer particles comprise a mixture of particles of a host polymer and particles of a guest polymer, which polymers may be incompatible or compatible with one another. The polymers may be electrocodeposited to form a microheterogeneous blend of polymer particles. The deposited film may be dried and subsequently coated with various layers for forming an electrophotographic imaging member.

The polymeric dispersions of the invention may be formed by a number of methods. In one embodiment, the polymers which form the polymer blends are each dissolved in a common solvent. A dispersion is formed by dispersing the resulting solution in a solvent which is a precipitant for both polymers so that small charged particles are formed. The polymers are then electrocodeposited at one electrode.

In another embodiment, a dispersion of a first polymer is prepared by adding a solution of the first polymer to a dispersant solvent. Then, a second polymer is dispersed in the dispersion of the first polymer by adding a solution of the second polymer to the dispersion of the first polymer. Charged particles of each polymer are thus prepared and electrocodeposited.

In yet another embodiment of the present invention, a solution of a first polymer is added to a dispersion of a second polymer which contains only a single non-solvent for the first polymer. The dispersant for the second polymer is also a dispersant for the first polymer, which results in a dispersion of charged particles of the first and second polymers in a multicomponent dispersant solvent system.

In yet another embodiment, a dispersion of a first polymer and a first solvent system is mixed directly with a dispersion of a second polymer in a second solvent system. The first and second polymers are dispersible in the resulting combined solvent system of the first and second solvent systems.

In another embodiment, a block copolymer composed of first and second blocks is dissolved in a solvent and then dispersed in a non-solvent to produce a dispersion. The dispersion also contains a second polymer which preferably is compatible with one of the first and second blocks. The dispersion is then electrodeposited to form the polymer film.

BRIEF DESCRIPTION OF THE DRAWINGS

A more complete understanding of the present invention can be obtained by reference to the accompanying Figures in which.

DESCRIPTION OF PREFERRED EMBODIMENTS

The film forming polymer blends of the invention may be prepared by depositing the polymers onto an electrode by an electrophoretic deposition process. This process generally employs the use of a conventional two-electrode cell containing an anode and a cathode. The polymer blends may be deposited either at the anode or at the cathode depending on the nature of the polymer or polymers. The anode or cathode may be, for example, a planar electrode, a seamless mandrel of cylindrical geometry, a complex geometry electrode, or the like.

A two-electrode cell which may be used in the present invention may be one wherein the working electrode is a seamless cylindrical mandrel. Electrocodeposition is carried out by application of moderate to low dc voltages. The polymer blends of the invention are electrocodeposited from a dispersion at one electrode of the electrocodeposition apparatus. The mandrel may be solid or hollow, and if hollow, electrodeposition may take place either on the inside surface or the outside surface. When deposition is desired on the inside surface of a hollow cylindrical working electrode, the counter electrode is generally a cylindrical mandrel sleeve of smaller diameter than the working electrode so that the cylinder of the counter electrode fits concentrically inside the cylinder of the working electrode. When deposition is desired on the outside surface of a cylindrical electrode, the working electrode is generally a seamless cylinder of a material such as nickel, and the counter electrode is a cylindrical sleeve of a material such as nickel that is of larger diameter than the working electrode, and is placed concentrically around the working electrode.

Any suitable material having electrically conductive surfaces may be used for the counter electrode and for the working electrode upon which the polymeric blends of the present invention are deposited. The electrodes should be dimensionally and thermally stable at the processing temperatures utilized, should be insoluble in the organic liquids employed in the electrocodeposition processes of the present invention, and should not react chemically with the components of the dispersion mixture. Electrode materials may include metals such as stainless steel, nickel, chromium, brass, platinum, and the like. Typical electrode materials may also include ceramic, glass, and the like coated with an electrically conductive coating. The electrode may be formed by extrusion molding, blow molding, injection molding, casting and the like to achieve the desired shape. Preferred electrodes are electroformed nickel mandrel sleeves prepared by electrodeposition of nickel from a nickel-containing bath. The electrode is generally cylindrical in shape and may be hollow or solid. The electrode surface on which the polymer is deposited functions as a molding surface for a film formed by the process of this invention.

Figure 1:
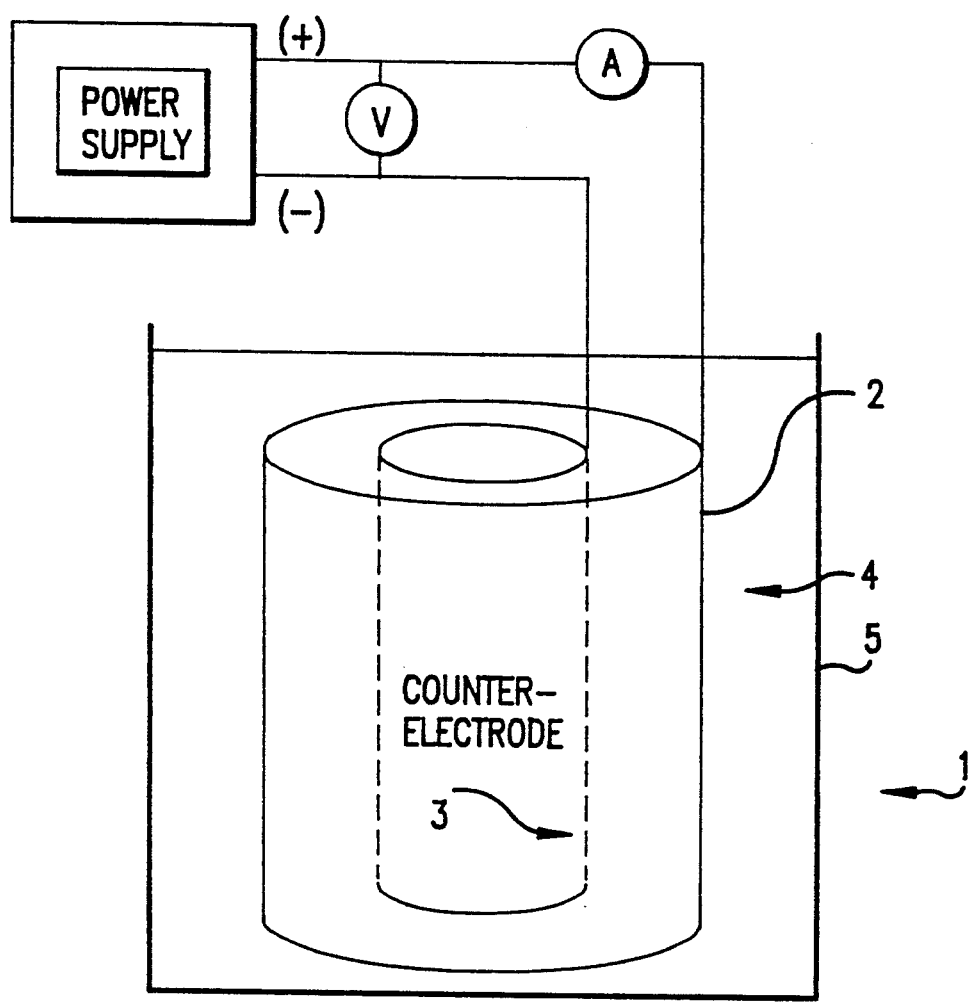
FIG. 1 is a schematic representation of an apparatus used for electrocodeposition in the present invention.

FIG. 1 shows a schematic illustration of an electrocodeposition apparatus 1 used in the invention, wherein a hollow, cylindrical working electrode 2 is provided having a counter electrode 3 positioned concentrically therein. A polymer dispersion 4 is contained within a bath 5. A power supply provides a positive current to the working electrode (anode) and a negative current to the counter electrode (cathode). The applied voltages may range from about 1 to about 120 volts, and the process of the invention preferably is carried out at 20 volts to about 50 volts.

After the desired thickness of polymer film is deposited, the mandrel containing the deposited polymer film is removed from the bath. The film on the mandrel is cured and, as appropriate, the solvent is removed. The film on the mandrel may be heated to effect curing and removal of solvent. The dry film may then be removed from the mandrel for coating of further layers, for example, for fabrication of an electrophotograhic imaging member.

In the above-described deposition process, a release agent may be applied to the electrode surface prior to deposition to facilitate removal of the polymer film. Release materials include, for example, silicones (e.g., E-155 silicone release coating and SWS F-544 cured with F-546 catalysts, both available from SWS Silicones and Dow Corning 20 mold release, available from Dow Corning Corporation); and the like. When release coatings are employed, the release coatings are preferably applied to a clean electrode surface. Conventional industrial procedures such as metal polishing followed by chemical washing, solvent cleaning and degreasing of the electrode prior to application of the release coating may be utilized. Depending upon the initial condition of the electrode surface, it may be desirable to remove dirt, rust, mill scale, paint, oil and the like. Typical coating techniques include dip coating, spray coating, brush coating, and the like.

Figure 2:
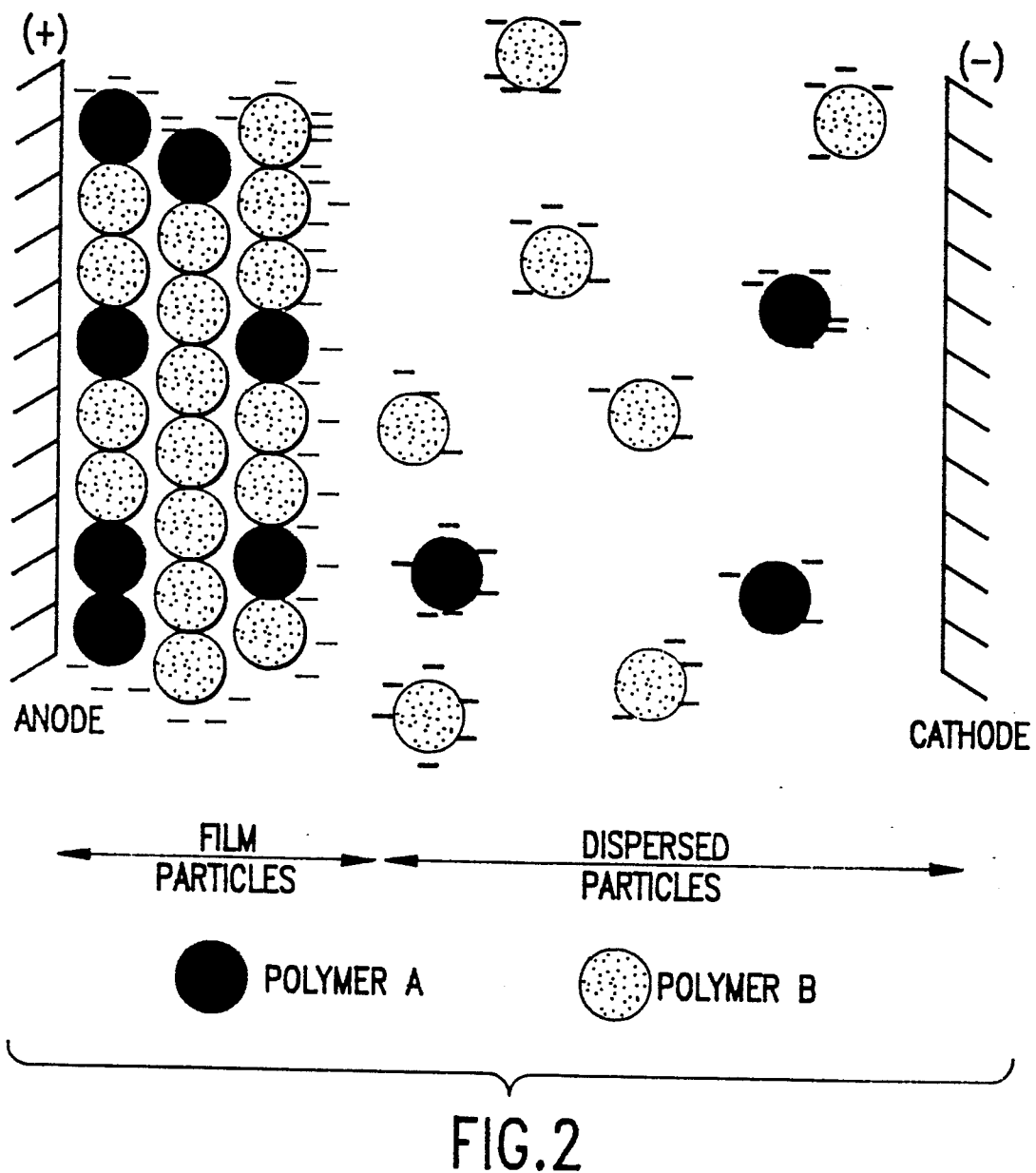
FIG. 2 is a schematic representation of an electrocodeposition of the present invention.

A schematic illustration of an electrocodeposition process of the present invention is shown in FIG. 2. In FIG. 2, deposition of the polymer blend of polymer A and polymer B is carried out at the anode. Charged dispersed polymer particles A and B migrate toward the oppositely charged electrodes to form a dense film. FIG. 2 shows an embodiment in which polymer B is the host polymer (major component) and polymer A is a guest polymer (minor component). The polymer films thus prepared are microheterogeneous, i.e., they contain microdomains of the guest polymer (minor component) in the host polymer (major component). The microdomains may range in thickness from about 2 micrometers to about 50 micrometers.

A number of methods may be utilized to form the polymer dispersion of the invention. Generally, a dispersion is formed containing at least two polymers. The dispersion is formed without a nitrogen-containing base. The dispersion of polymers is electrodeposited to form the film containing the microdomains of the guest polymer in the host polymer.

In one method of forming a dispersion, which hereinafter will be referred to as the simultaneous process, a first polymer A and a second polymer B which are to be electrocodeposited are sequentially dissolved in a common solvent forming a solution of polymer A and polymer B. The solution is then dispersed in a solvent which is a precipitant of both polymer A and polymer B. The resulting dispersion is comprised of small charged particles of each polymer. The dispersion containing polymers A and B is used in an apparatus such as that shown in FIG. 1.

A second method in which a dispersion may be prepared for electrocodeposition of the invention comprises preparing a dispersion of polymer A by adding a solution of polymer A to a dispersant solvent for polymers A and B. Polymer B is then dispersed in the dispersion of polymer A by adding a solution of polymer B to the dispersion of polymer A.

Another method of preparing a dispersion for electrocodeposition of the invention includes adding a solution of polymer B to a dispersion of polymer A which contains only a single, non-solvent for polymer B, i.e., the dispersant for polymer A is also a dispersant for polymer B. This results in a dispersion of charged particles of A and B in a multicomponent dispersant solvent system.

Yet another method of preparing a dispersion for electrocodeposition of the present invention includes mixing a dispersion of polymer A in solvent system A' directly with a dispersion of polymer B in solvent system B'. Polymers A and B in this embodiment must be dispersible in the resulting solvent system A'+B'.

Another method of preparing a dispersion for use in an electrocodeposition process of the present invention includes dissolving a diblock or multiblock copolymer or graft copolymer composed of blocks of A and B in a solvent, and then dispersing the solution in a non-solvent. The block copolymers must be combined with a second polymer which is compatible with at least one of the blocks.

The above methods of preparing dispersions for electrocodeposition may include use of any of a number of suitable polymers and solvents. The polymers which form the polymer blends of the invention may be polymers which are compatible with one another, but may also be polymers which are incompatible with one another. The present invention advantageously allows for the electrocodeposition of incompatible polymers. By incompatible polymers, it is meant polymers which phase segregate when mixed due to their mutual insolubility in one another. Most polymers are mutually incompatible. It is generally not possible to prepare homogeneous films of incompatible polymer blends by other techniques such as solvent casting or spraying.

Suitable film forming thermoplastic polymers must be capable of forming a dispersion of electrically charged, thermoplastic film forming polymer particles in an organic liquid. The expression "dispersion" as used herein is defined as fine particles having an average particle size of less than 100 μm in diameter distributed in a liquid medium with no direct contact between the particles. The dispersions employed in the process of this invention should be substantially free of polymer particle agglomerates. The expression "substantially free of polymer particle agglomerates" as used herein is defined as free of any polymer particle agglomerates having a size larger than about two to about five times the average particle size of polymer particles in the dispersion. Agglomerates having a size larger than about two to about five times the average particle size of polymer particles in the dispersion can deposit onto the sleeve electrode and cause an irregular surface to form on the belt. Agglomerates may be filtered out, if desired.

Any suitable high molecular weight polar or nonpolar thermoplastic film forming polymer may be employed in the process of this invention. Typical nonpolar thermoplastic film forming polymers include chloro, bromo or fluoro substituted polyvinyl compounds such as polyvinyl fluoride, (e.g., Tedlar available from E.I. du Pont de Nemours & Co.), polyvinylidene fluoride (e.g., Kynar 202 available from Pennwalt Corp.), and polyvinyl chloride; polyethylene; polypropylene; polyethers; styrene-butadiene copolymers; polybutylenes; and the like. Typical polar thermoplastic film forming polymers include polyamides (e.g., nylon); polycarbonates (e.g., Makrolon 5705, available from Bayer Chemical Co.; Merlon M39, available from Mobay Chemical Co.; Lexan 145, available from General Electric Co.); polyesters (e.g., PE-100 and PE-200, available from Goodyear Tire and Rubber Co.); polysulfones (e.g., Victrex, available from ICI Americas); polysulfides; cellulosic resins; polyarylates; acrylic resins; polyarylsulfones; polyphenylenesulfides; polyurethanes; polyimides; epoxies; poly(amide-imide) (e.g., Torlon Polymer T-10, Torlon TF-4000, available from AMOCO Chemical Corp.); copolyesters (Kodar Copolyester PETG 6763 available from Eastman Kodak Co.); polyethersulfones; polyetherimides (e.g., Ultem available from General Electric Co.); polyarylethers; and the like. Polycarbonate polymers may be made, for example, from 2,2-bis(4-hydroxyphenol)propane, 4,4'-dihydroxy-diphenyl-1,1- ethane, 4,4'-dihydroxy-diphenyl-1,1-isobutane, 4,4'-dihydroxy-diphenyl-4,4-heptane, 4,4'-dihydroxy-diphenyl-2,2-hexane, 4,4'-dihydroxy-triphenyl-2,2,2-ethane, 4,4'-dihydroxy-diphenyl-1,1-cyclohexane, 4,4'-dihydroxy-diphenyl-$\beta$-$\beta$-decahydronaphthalene, cyclopentane derivatives of 4,4'-dihydroxy-diphenyl-$\beta$-$\beta$-decahydronaphthalene, 4,4'-dihydroxy-diphenyl-sulfone, and the like.

Diblock copolymers or multiblock copolymers (such as General Electric STM1500 silicone copolymer) may be employed in the process of this invention. A diblock copolymer consists of polymer chains which contain two chemically distinct monomers A and B such that all A monomers are connected into an A block and all the B monomers are connected into a B block such as polystyrenepolybutadiene diblock polymers. Multiblock polymers contain multiple blocks of A monomer and B monomer such as General Electric STM1500 silicone copolymer. One of the A or B components of the block copolymer should be compatible with a second polymer A' which can serve as either the host or guest polymer. This insures good interfacial adhesion between the incompatible A' and B phases.

Solvents for dissolving the polymer in solution may include any solvent which is known to dissolve a particular polymer. For example, polymers such as poly(amideimides) and polyethersulfones may be dissolved in N-methyl pyrrolidone (NMP) or dimethylformamide. Likewise, any known solvent which is a dispersant for the polymer solution may be used as the dispersant. For example, poly(amideimides) and polyethersulfones may be dispersed in solvents such as acetonitrile, butyronitrile, acetone, MIBK (methylisobutyl ketone), and the like. Suitable liquid dispersion media generally are determined for each polymer, and are those that disperse the polymer without forming a large amorphous mass. The liquid dispersion medium is preferably one that results in the polymer becoming electrostatically charged upon being dispersed in the liquid. Suitable liquid dispersion media include solvent/non-solvent combinations of materials such as solvents dimethylsulfoxide, N-alkylpyrrolidones such as N-methylpyrrolidone, dialkylformamides such as dimethyl formamide, dialkylacetamides such as dimethylacetamide, N-alkyl formamides such as N-methylformamide, and N-alkylacetamides such as N-methylacetamide; and non-solvents propylene carbonate, acetone, alkyl ketones such as methylethylketone and methylisobutylketone, alkylnitriles such as acetonitrile, propionitrile, and butyronitrile, and the like. For example, when the host polymer is polyvinyl fluoride or polyvinylidene fluoride, the preferred liquid dispersion medium is propylene carbonate. For host polymers such as poly(amide-imide) and polyimide, preferred liquid dispersion media comprise a solvent such as dimethylsulfoxide and amine containing solvents, such as N-methylpyrrolidone, dimethylformamide, dimethylacetamide, N-methylformamide, N-methylacetamide, and the like, and a non-solvent such as acetone, methylethylketone, methylisobutylketone, acetonitrile, propionitrile, butyronitrile, and the like.

After the polymer has been dissolved in a solvent, a dispersion may be formed by adding the mixture to a suitable non-solvent. Suitable non-solvents are liquids in which the polymer is not soluble but which are miscible with the polymer solvent and include materials such as aliphatic nitriles and ketones. Addition of the solvent in an amount of from about 21 to about 33 volume percent, preferably about 28 volume percent, results in formation of a dispersion of particles of the host polymer in the liquid dispersion medium in a concentration of from about 0.1 to about 1 percent by weight, preferably about 1 percent by weight. Addition of the polymer to the liquid dispersion medium results in the polymer becoming charged.

The concentration of host polymer in the liquid dispersion medium is generally from about 0.1 to about 0.7 percent by weight, with about 0.7 percent by weight being preferred. The guest polymer in the liquid dispersion may range from about 0.1 to about 0.3 percent by weight, with about 0.3 percent by weight being preferred.

A typical combination of polymer and organic liquid dispersion medium includes polyvinylfluoride and propylene carbonate, isophorone, N-methyl pyrrolidone, N,N,-dimethylformamide, butyrolactone, dimethylphthalate, acetophenone, acetyl triethyl citrate, aniline, n-butyl levulinate, dibenzyl ether, dibutyl fumarate, di-n-butyl maleate, dibutyl phthalate, di-n-butyl succinate, dibutyl tartarate, di(2-ethyl hexyl)phthalate, diethyl phthalate, diethyl maleate, diethyl phthalate, diethyl sebacate, dimethyl adipate, dioctyl adipate, ethyl levulinate, quinoline, o-toluidine, triacetin, tributyl citrate, tributyl phosphate, triethyl citrate or triethyl phosphate. Another example of a combination of polymer and organic liquid dispersion medium is polyvinylidene fluoride and butyrolacetone, isophorone, carbinol acetate, methyl isobutyl ketone, n-butyl acetate, cyclohexanone, diacetone alcohol, diisobutyl ketone, ethyl acetoacetate, triethyl phosphate, propylene carbonate, or dimethyl phthalate. Still other examples include combinations of propylene carbonate organic liquid dispersion medium with a polymer of nylon, polyvinyl chloride, polyvinyl chloride-polyvinylidene chloride or polyvinylidene chloride-polyacrylonitrile.

The dispersion should be substantially free of water because it can cause polymer agglomerates and chunks to form in the final film. Water also prevents or retards electrodeposition. The expression "substantially free of water" as employed herein is defined as containing less than about 1 percent based on the total weight of the liquid dispersion medium.

If desired, the dispersion mixture may be modified by additional material. Thus, for example, the conductivity of the dispersion may be altered to the desired value by the incorporation into the dispersion mixture of minor amounts of additives or relatively large amounts of a second organic liquid.

An example of an appropriate second organic liquid is alcohols. The addition of alcohol can alter conductivity, thereby permitting conductivity adjustments to achieve a level at which satisfactory polymer particle deposition occurs. The change in conductivity of the organic liquid phase is believed to be due to ion species residing on the surface of the polymer particles in the liquid dispersion medium. The counter charge resides on the particle and results in more charge on the polymer particles, thereby enhancing migration. However, the measured current and higher conductivity of the dispersion are due to the ions in the solvent. The dispersed polymer particles migrate to the electrode but on arrival do not charge exchange completely due to the insulating nature of the particles. The charge which resides on the polymer particles in a region which does not contact the electrode remains and holds the particle onto the electrode. If the electrode is removed from the dispersion and a conductive liquid applied to the particles on the electrode, complete charge exchange would occur and the particles would lose their adhesion and wash away with the conductive liquid. This will not occur with insulating liquids. An alcohol such as methanol renders the polymer particles more ionic and leads to higher deposition rates with steady currents. The current is steady because the film build-up is not limited by the insulating nature of the particles. The current that flows during the deposition is primarily the leakage current and not due to the polymer particles migrating to the cathode and undergoing charge exchange. Other suitable lower alcohols may also be used to control the degree of ionization of surface charges on the polymer particles or conductivity. As indicated above, a preferred electrical conductivity for the dispersion mixture is between about $4 \times 10^{-8}$ mho/cm and about $1.0 \times 10^{-3}$ mho/cm. Typical alcohols include methanol, ethanol, isopropanol, and ethylene glycol. The alcohols should contain from 1 to 3 carbon atoms. Generally, the amount of low boiling alcohols added to the dispersion should be minimized to avoid bubble formation in the film during heating due to alcohol trapped in the film.

Any suitable additives, such as release agents, surfactants and charge control agents may be added to the polymer dispersions of the invention. For example, an additive may be added to enhance wetting of the electrode, adjust electrical conductivity, alter dielectric properties, facilitate film removal, stabilize the dispersion, increase deposition rate, act as an antioxidant, thermal stabilizer, curing agent, reinforcing agent, dye or coloring agent, and the like. Generally, the total additive amount of release agent, surfactant and charge control agent added to the dispersion is less than about 1 percent by weight based on weight of dispersion solids.

The additive may comprise a minor amount of any suitable release agent to facilitate release of the polymer film formed on the electrode. When release promoting additives are placed into a polymer dispersion and hence are present in the belt after processing, the additives promote release by reducing the adhesive force to the mandrel. The additives may not necessarily provide soft release per se of the belt from the mandrel with cooling to room temperature, but can reduce the adhesion of the belt to the mandrel and thus render it easier to remove by peeling. These are typically surface tension reducing materials such as fluoro-organic surfactants. These materials can also serve a dual function in that they can function as conditioning additives for the dispersion to prevent the formation of agglomerates, establish a linear relationship between film thickness and deposition time, and give a steady current during the deposition. Typical release materials include, for example, mold release agents such as silicones, fluorocarbons, hydrocarbons, soaps, detergents, surfactants (e.g. Silwet L-7500, Silwet L-7602, available from Union Carbide Corporation and GAFAC RA600 available from GAF Corporation), and the like. The release material may be added to the dispersion, but should be compatible with the polymers. In other words, when added to the liquid dispersion medium, the release material should be compatible with the dispersion medium and not phase separate. As a coating on an electrode, the release material is preferably not soluble in the liquid dispersion medium.

The additive may comprise a minor amount of surfactant to stabilize the dispersion and/or modify the surface charge of the polymers. The surfactant is surface active and added to the liquid dispersion medium to coat the small charged particles, promote the formulation of stable dispersions by steric repulsion effects, and modify the charge. A stable dispersion is one which does not settle or is one which is easily dispersible if some sedimentation occurs. The surfactant may, for example, be any suitable cationic, anionic, or amphoteric compound which may be dissociated in the organic liquid dispersion medium and absorbed onto the thermoplastic film forming particles to impart to them a net resulting surface charge which determines whether they migrate to the anode or the cathode. Typical surfactants include fluorosurfactants (such as Zonyl FSC, available from du Pont), fluorinated alkyl quaternary ammonium iodide (such as FC-135, a cationic surfactant available from 3M Company), cationic fluorosurfactant (such as Monflor-72, available from ICI American Inc.), and the like. Zonyl surfactants are characterized as having an R group in the molecule which imparts to the molecules an extreme tendency to orient at inner faces with low interaction between the fluorocarbon chains. The R groups can be, for example, fluoro, fluoromethyl ($CF_3$—), fluoroethyl ($CF_3CF_2$—), fluoropropyl ($CF_3CF_2CF_2$—), fluorobutyl ($CF_3CF_2CF_2CF_2$—), and the like. These fluorosurfactants lower the surface tension of solutions very well. Also, for example, Zonyl FSC surfactant is cationic and is soluble in organic dispersing media such as propylene carbonate and is believed to dissociate to lead to a positively charged ionic species with a fluorocarbon R group and a negatively charged species of an ionic type. It is believed that the positively charged group is absorbed onto thermoplastic film forming particles, for example polyvinyl fluoride, which have partially dissociated negatively charged groups remaining on their surface. This results in fluorocarbon groups which sterically radiate from the polyvinyl fluoride particles and prevent agglomerate formation and further adds to the positive charge on the polyvinyl fluoride particles. This also causes an increase in the rate of deposition of polyvinyl fluoride particles onto the cathode and the negatively charged species with some non-absorbed dissociated cationic surfactant resulting in an increase in the leakage current through the organic liquid dispersion medium. The dispersion can contain up to about 1.5% by weight surfactant based on the total weight of the dispersion solids.

The film forming particles must acquire a sufficient electrostatic charge in the liquid dispersion medium for electrodeposition. A charge control agent may be added to promote acquisition of sufficient electrostatic charge to migrate under the influence of an electric field. Typical charge control agents include the same dispersant additives listed above, including for example, Zonyl FSC surfactant, FC-135 fluorinated alkyl quaternary ammonium iodide, and other fluoro-organic surfactants which are cationic and miscible with the liquid phase of the dispersion, and the like. Generally, the relative amounts of charge control agent added to the dispersion may be up to about 10% by weight based on the weight of dispersion solids. This charge control agent may also perform other functions such as those of a release agent or dispersion stabilizer as described above. Sufficient charge control agents should be added to the dispersion to impart a charge to the film forming particles sufficient to achieve a deposition rate of, for example, about 150 micrometers per minute. If desired, the addition of charge control agents may be omitted for polar polymers. The addition of charge control agents may also contribute to agglomerate free coatings. Thus incorporation of suitable additives such as lower alcohols, e.g. methanol, ethanol and isopropanol, or cationic surfactants, can enhance the polymer particle deposition rates and minimize the formation of agglomerates.

Thermoplastic films fabricated by the process of the invention should be thin and flexible. In general, film thicknesses of up to about 100 mils may be obtained by the methods of the present invention. The final thickness of a flexible film depends on numerous factors, including economic considerations and whether the film constitutes the only layer in the final product. Thus, the film may be of substantial thickness, for example, as thick as about 100 mils, or as thin as about 0.5 mils.

When the film is a substrate to be used in an electrophotograhic imaging member, the thickness of the film should be selected to avoid any adverse effects on the final device. Substrates that are too thin can split and exhibit poor durability characteristics. When the substrate is excessively thick, early failure during cycling and higher cost for unnecessary material are often observed. A belt according to the invention may comprise a conductive layer or an insulating layer. If the electrodeposited film is insulating and is intended to be employed in an electrophotographic imaging member, it is normally coated with one or more additional layers such as a conductive layer. Additional layers which may be applied to the electrically conductive layer may include a blocking layer, an adhesive layer, a photoconductive layer or a combination of these layers with or without additional layers.

When employed in an electrophotographic imaging member, the films of the invention may be used as a supporting substrate. An electrophotographic imaging member can be fabricated by coating on the substrate a conductive layer, a blocking layer, an adhesive layer, a charge generating layer and a charge transport layer. A description of these layers follows.

The conductive layer (electrically conductive ground plane) may be an electrically conductive metal layer which may be formed, for example, on the substrate by any suitable coating technique, such as a vacuum depositing technique. Typical metals include aluminum, zirconium, niobium, tantalum, vanadium, hafnium, titanium, nickel, stainless steel, chromium, tungsten, molybdenum, and the like, and mixtures thereof. The conductive layer may vary in thickness over substantially wide ranges depending on the optical transparency and flexibility desired for the electrophotoconductive member. Accordingly, for a flexible photoresponsive imaging device, the thickness of the conductive layer may be between about 20 Angstroms to about 750 Angstroms, and more preferably from about 50 Angstroms to about 200 Angstroms for an optimum combination of electrical conductivity, flexibility and light transmission.

Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer. Generally, for rear erase exposure, a conductive layer light transparency of at least about 15% is desirable. The conductive layer need not be limited to metals. Other examples of conductive layers may be combinations of materials such as conductive indium tin oxide as a transparent layer for light having a wavelength between about 4000 Anstroms and about 9000 Angstroms or a conductive carbon black dispersed in a plastic binder as an opaque conductive layer.

After deposition of the electrically conductive ground plane layer, a blocking layer may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized. The hole blocking layer may include polymers such as polyvinylbutyral, epoxy resins, polyesters, polysiloxanes, polyamides, polyurethanes and the like, or may be nitrogen-containing siloxanes or nitrogen-containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzenesulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonate oxyacetate, titanium 4-aminobenzoate isostearate oxyacetate, [H$_2$N(CH$_2$)$_4$]CH$_3$Si(OCH$_3$)$_2$, (gamma-aminobutyl methyl diethoxysilane), [H$_2$N(CH$_2$)$_3$]CH$_3$Si(OCH$_3$)$_2$ (gamma-aminopropyl methyl diethoxysilane), and [H$_2$N(CH$_2$)$_3$]Si(OCH$_3$)$_3$ (gamma-aminopropyl triethoxysilane) as disclosed in U.S. Pat. Nos. 4,338,387, 4,286,033 and 4,291,110. A preferred hole blocking layer comprises a reaction product between a hydrolyzed silane or mixture of hydrolyzed silanes and the oxidized surface of a metal ground plane layer. The oxidized surface inherently forms on the outer surface of most metal ground layers when exposed to air after deposition. This combination enhances electrical stability at low RH. The hydrolyzed silanes have the general formula

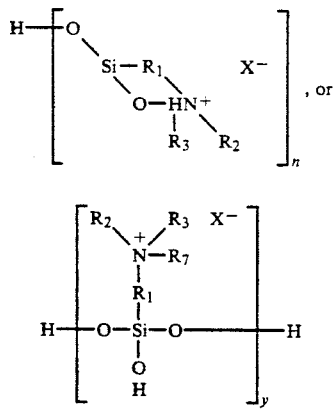

wherein R$_1$ is an alkylidene group containing 1 to 20 carbon atoms, R$_2$, R$_3$ and R$_7$ are independently selected from the group consisting of H, a lower alkyl group containing 1 to 3 carbon atoms and a phenyl group, X is an anion of an acid or acidic salt, n is 1–4, and y is 1–4. The imaging member is preferably prepared by depositing on the metal oxide layer of a metal conductive layer, a coating of an aqueous solution of the hydrolyzed aminosilane at a pH between about 4 and about 10, drying the reaction product layer to form a siloxane film and applying an adhesive layer, and thereafter applying electrically operative layers, such as a photogenerator layer and a hole transport layer, to the adhesive layer.

The blocking layer should be continuous and have a thickness of less than about 0.5 micrometer because greater thicknesses may lead to undesirably high residual voltage. A hole blocking layer of between about 0.005 micrometer and about 0.3 micrometer is preferred because charge neutralization after the exposure step is facilitated and optimum electrical performance is achieved. A thickness of between about 0.03 micrometer and about 0.06 micrometer is preferred for optimum electrical behavior. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layer is preferably applied in the form of a dilute solution, with the solvent being removed after deposition of the coating by conventional techniques such as by vacuum, heating and the like. Generally, a weight ratio of blocking layer material and solvent of between about 0.05:100 to about 0.5:100 is satisfactory for spray coating.

In most cases, intermediate layers between the blocking layer and the adjacent charge generating or photogenerating layer may be desired to promote adhesion. For example, the adhesive layer may be employed. If such layers are utilized, they preferably have a dry thickness between about 0.001 micrometer to about 0.2 micrometer. Typical adhesive layers include film-forming polymers such as polyester, du Pont 49,000 resin (available from E.I. du Pont de Nemours & Co.), Vitel PE-100 (available from Goodyear Rubber & Tire Co.), polyvinylbutyral, polyvinylpyrrolidone, polyurethane, polymethylmethacrylate, and the like.

Any suitable charge generating (photogenerating) layer may be applied to the adhesive layer. Examples of materials for photogenerating layers include inorganic photoconductive particles such as amorphous selenium, trigonal selenium, and selenium alloys selected from the group consisting of selenium-tellurium, selenium-tellurium-arsenic, selenium arsenide; and phthalocyanine pigment such as the X-form of metal-free phthalocyanine described in U.S. Pat. No. 3,357,989; metal phthalocyanines such as vanadyl phthalocyanine and copper phthalocyanine; dibromoanthanthrone; squarylium; quinacridones such as those available from du Pont under the tradename Monastral Red, Monastral Violet and Monastral Red Y; dibromo anthanthrone pigments such as those available under the trade names Vat orange 1 and Vat orange 3; benzimidazole perylene; substituted 2,4-diamino-triazines such as those disclosed in U.S. Pat. No. 3,442,781; polynuclear aromatic quinones such as those available from Allied Chemical Corporation under the tradename Indofast Double Scarlet, Indofast Violet Lake B, Indofast Brilliant Scarlet and Indofast Orange; and the like, dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639. Other suitable photogenerating materials known in the art may also be utilized, if desired. Charge generating layers comprising a photoconductive material such as vanadyl phthalocyanine, metal-free phthalocyanine, benzimidazole perylene, amorphous selenium, trigonal selenium, selenium alloys such as selenium-tellurium, selenium-telluriumarsenic, selenium arsenide, and the like and mixtures thereof are especially preferred because of their sensitivity to white light. Vanadyl phthalocyanine, metal-free phthalocyanine and tellurium alloys are also preferred because these materials provide the additional benefit of being sensitive.

Any suitable polymeric film-forming binder material may be employed as the matrix in the photogenerating layer. Typical polymeric film-forming materials include those described, for example, in U.S. Pat. No. 3,121,006. The binder polymer should adhere well to the adhesive layer, dissolve in a solvent which also dissolves the upper surface of the adhesive layer and be miscible with the copolyester of the adhesive layer to form a polymer blend zone. Typical solvents include tetrahydrofuran, cyclohexanone, methylene chloride, 1,1,1-trichloroethane, 1,1,2-trichloroethane, trichloroethylene, toluene, and the like, and mixtures thereof. Mixtures of solvents may be utilized to control evaporation range. For example, satisfactory results may be achieved with a tetrahydrofuran to toluene ratio of between about 90:10 and about 10:90 by weight. Generally, the combination of photogenerating pigment, binder polymer and solvent should form uniform dispersions of the photogenerating pigment in the charge-generating layer coating composition. Typical combinations include polyvinylcarbazole, trigonal selenium and tetrahydrofuran; phenoxy resin, trigonal selenium and toluene; and polycarbonate resin, vanadyl phthalocyanine and methylene chloride. The solvent for the charge generating layer binder polymer should dissolve the polymer binder utilized in the charge generating layer and be capable of dispersing the photogenerating pigment particles present in the charge generating layer.

The photogenerating composition or pigment may be present in the resinous binder composition in various amounts. Generally, from about 5% by volume to about 90% by volume of the photogenerating pigment is dispersed in about 10% by volume to about 90% by volume of the resinous binder. Preferably from about 20% by volume to about 30% by volume of the photogenerating pigment is dispersed in about 70% by volume to about 80% by volume of the resinous binder composition. In one embodiment, about 8% by volume of the photogenerating pigment is dispersed in about 92% by volume of the resinous binder composition.

The photogenerating layer generally ranges in thickness from about 0.1 micrometer to about 5.0 micrometers, preferably from about 0.3 micrometer to about 3 micrometers. The photogenerating layer thickness is related to binder content. Higher binder content compositions generally require thicker layers for photogeneration. Thicknesses outside these ranges can be selected, providing the objectives of the present invention are achieved.

Any suitable and conventional technique may be utilized to mix and thereafter apply the photogenerating layer coating mixture to the previously dried adhesive layer. Typical application techniques include spraying, dip coating, roll coating, wire wound rod coating, and the like. Drying of the deposited coating may be effected by any suitable conventional technique such as oven drying, infrared radiation drying, air drying and the like, to remove substantially all of the solvents utilized in applying the coating.

The charge transport layer may comprise any suitable transparent organic polymer or non-polymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack, and therefore extends the operating life of the photoreceptor imaging member. The charge transport layer should exhibit negligible, if any, discharge when exposed to a wavelength of light useful in xerography, e.g. 4000 Anstroms to 9000 Angstroms. The charge transport layer is normally transparent in a wavelength region in which the photoconductor is to be used when exposure is effected therethrough to ensure that most of the incident radiation is utilized by the underlying charge generating layer. When used with a transparent substrate, imagewise exposure or erasure may be accomplished through the substrate with all light passing through the substrate. In this case, the charge transport material need not transmit light in the wavelength region of use. The charge transport layer in conjunction with the charge generating layer is an insulator to the extent that an electrostatic charge placed on the charge transport layer is not conducted in the absence of illumination.

The charge transport layer may comprise activating compounds or charge transport molecules dispersed in normally electrically inactive film-forming polymeric materials for making these materials electrically active. These charge transport molecules may be added to polymeric materials which are incapable of supporting the injection of photogenerated holes and incapable of allowing the transport of these holes. An especially preferred transport layer employed in multilayer photoconductors comprises from about 25% to about 75% by weight of at least one charge-transporting aromatic amine, and about 75% to about 25% by weight of a polymeric film-forming resin in which the aromatic amine is soluble.

The charge transport layer is preferably formed from a mixture comprising at least one aromatic amine compound of the formula:

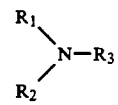

wherein $R_1$ and $R_2$ are each an aromatic group selected from the group consisting of a substituted or unsubstituted phenyl group, naphthyl group, and polyphenyl group and $R_3$ is selected from the group consisting of a substituted or unsubstituted aryl group, an alkyl group having from 1 to 18 carbon atoms and a crycloaliphatic group having from 3 to 18 carbon atoms. The substituents should be free from electron-withdrawing groups such as $NO_2$ groups, CN groups, and the like. Typical aromatic amine compounds that are represented by this structural formula include:

I. Triphenyl amines such as:

-continued

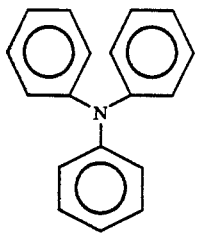

II. Bis and poly triarylamines such as:

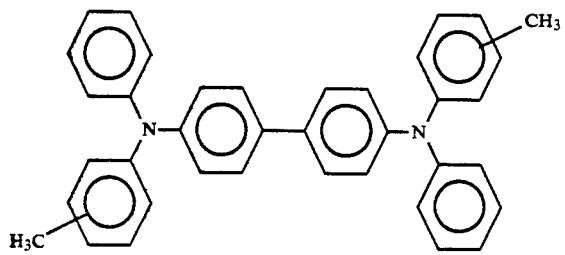

III. Bis arylamine ethers such as:

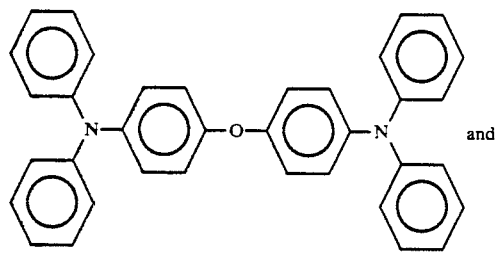 and

IV. Bis alkyl-arylamines such as:

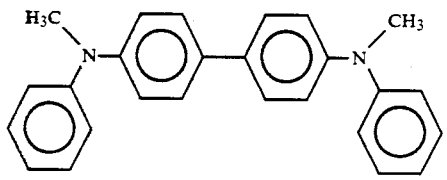

A preferred aromatic amine compound has the general formula:

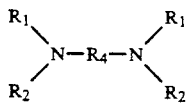

wherein $R_1$ and $R_2$ are defined above, and $R_4$ is selected from the group consisting of a substituted or unsubstituted biphenyl group, a diphenyl ether group, an alkyl group having from 1 to 18 carbon atoms, and a cycloaliphatic group having from 3 to 12 carbon atoms. The substituents should be free from electron-withdrawing groups such as $NO_2$ groups, CN groups, and the like.

Examples of charge-transporting aromatic amines represented by the structural formulae above include triphenylmethane, bis(4-diethylamine-2-methylphenyl)-phenylmethane; 4,4'-bis(diethylamino)-2,2'-dimethyltriphenylmethane; N,N'-bis(alkylphenyl)-1,1'-biphenyl)-4,4'-diamine wherein the alkyl is, for example, methyl, ethyl, propyl, n-butyl, etc.; N,N'-diphenyl-N,N'-bis(3-methylphenyl)-(1,1'biphenyl)-4,4'-diamine; and the like, dispersed in an inactive resin binder.

Any suitable inactive resin binder soluble in methylene chloride or other suitable solvents may be employed. Typical inactive resin binders soluble in methylene chloride include polycarbonate resin, polyvinylcarbazole, polyester, polyarylate, polyacrylate, polyether, polysulfone, and the like. Molecular weights can vary from about 20,000 to about 1,500,000. Other solvents that may dissolve these binders include tetrahydrofuran, toluene, trichloroethylene, 1,1,2-trichloroethane, 1,1,1-trichloroethane, and the like.

The preferred electrically inactive resin materials are polycarbonate resins having a molecular weight from about 20,000 to about 120,000, more preferably from about 50,000 to about 100,000. The materials most preferred as the electrically inactive resin material are poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000 available as Lexan 141 from General Electric Company; a polycarbonate resin having a molecular weight of from about 50,000 to about 100,000, available as Makrolon from Farbenfabricken Bayer A.G.; a polycarbonate resin having a molecular weight of from about 20,000 to about 50,000, available as Merlon from Mobay Chemical Company; polyether carbonates; and 4,4,-cyclohexylidene diphenyl polycarbonate. Methylene chloride solvent is a desirable component of the charge transport layer coating mixture for adequate dissolving of all the components and for its low boiling point.

An especially preferred multilayer photoconductor comprises a charge generating layer comprising a binder layer of photoconductive material and a contiguous hole transport layer of a polycarbonate resin material having a molecular weight of from about 20,000 to about 120,000, having dispersed therein from about 25 to about 75% by weight of one or more compounds having the formula:

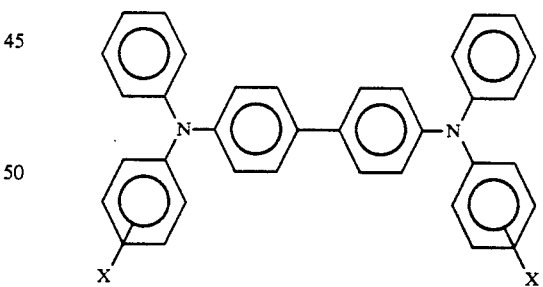

wherein X is selected from the group consisting of an alkyl group, having from 1 to about 4 carbon atoms, and chlorine, the photoconductive layer exhibiting the capability of photogeneration of holes and injection of the holes, the hole transport layer being substantially non-absorbing in the spectral region at which the photoconductive layer generates and injects photogenerated holes but being capable of supporting the injection of photogenerated holes from the photoconductive layer and transporting the holes through the hole transport layer.

The thickness of the charge transport layer range from about 10 micrometers to about 50 micrometers, and preferably from about 20 micrometers to about 35 micrometers. Optimum thicknesses may range from about 23 micrometers to about 31 micrometers.

The invention will further be illustrated in the following, non-limiting examples, it being understood that these examples are intended to be illustrative only and that the invention is not intended to be limited to the materials, conditions, process parameters and the like recited herein.

EXAMPLE 1

The preparation of a film containing roughly 23 wt % polyethersulfone and 77 wt % polyamideimide is performed as follows: 2.01 g of polyethersulfone (Victrex, ICI Americas) is dissolved in 350 ml 1-methyl-2-pyrolidinone at 100°–120° C. Subsequently 6.780 g Torlon T-10 (Amoco) is dissolved in the mixture at this temperature. The resulting mixture is then cooled to room temperature and added slowly with stirring to 900 ml methylisobutyl ketone. A pale yellow dispersion is formed which is filtered through a 30 μm filter. A 3 inch diameter × 3 inch tall electroformed nickel mandrel sleeve (working electrode) is spray coated with a Dow Corning 20 silicone mold release agent and the excess wiped off. The treated electrode is placed in the dispersion. A 1½ inch diameter counterelectrode is placed concentrically within the working electrode and a constant +45V potential from a Kepco APH500M power supply is applied for 22.5 minutes. The working electrode is the anode (connected to the positive terminal of the power supply). During the electrodeposition the current diminishes from 4.0 to 1.9 mA as the thickness of the polymer deposit increases. The polymer coated nickel mandrel sleeve is removed from the dispersion under potential control. The wet film is dried in air for 6 minutes, then at 105° C. for 25 minutes and at 165° C. for 60 minutes in a convection oven. After cooling to room temperature a seamless transparent film, approximately 2 mils in thickness is parted from the mandrel.

The preparation of a film containing 50 wt % polyethersulfone and 50 wt % polyamideimide is performed similarly. A dispersion containing 4.4 g each of polyethersulfone and polyamideimide in 375 ml dimethylacetamide and 870 ml methylisobutylketone is prepared by dissolving polyethersulfone in dimethylacetamide at 140° C. followed by dissolution of polyamideimide at 140° C. This mixture is added to methylisobutylketone over 3.5 minutes with stirring. The dispersion is filtered through a 30 μm filter before use; no agglomerates are observed. A 1 μm film is electrodeposited on a smooth optically transparent conductive tin oxide electrode deposited on a glass substrate by applying +20V for 1 minute and curing the resulting wet film at 90° C. for 15 minutes.

The preparation of a film containing 77 wt % polyethersulfone and 23 wt % polyamideimide is performed similarly. A dispersion containing 6.777 g polyethersulfone and 2.026 g polyamideimide in 375 ml dimethylacetamide and 870 ml is obtained as above. An approximate 1 μm film of 77% polyethersulfone and 23% polyamideimide is electrodeposited on a tin oxide electrode and cured as in the 50—50% example of polyethersulfone-polyamideimide above. Electrodeposition is also performed on a silicone coated seamless Ni mandrel sleeve at +40V for 15 minutes and a current of 3–4 mA. Solvent removal involves evaporation at room temperature in air for 15 minutes and drying in air at 90°, 100°, 110°, 120°, 130° C. for 15 minutes at each temperature, and finally at 190° C. for one hour. A 31.8 μm seamless belt is obtained.

Figure 3:
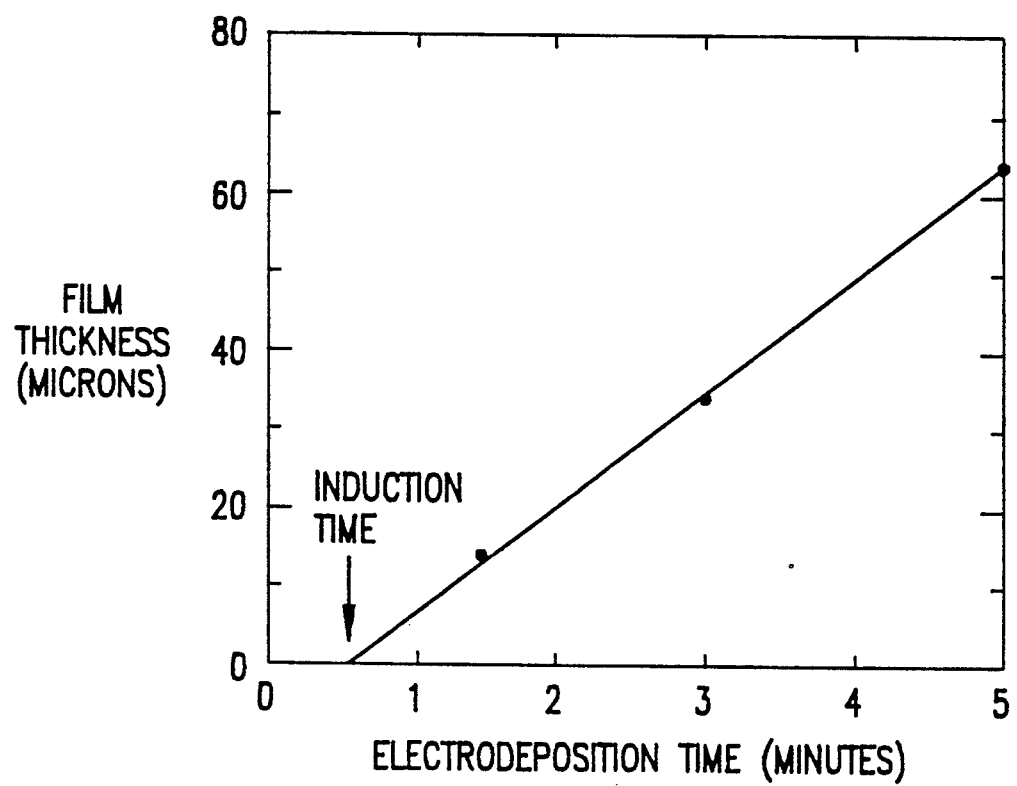
FIG. 3 is a plot of film thickness of a film of 77% polyamideimide/23% polyethersulfone as a function of the electrodeposition time.

The growth rate of a film containing 77 wt % polyamideimide and 23 wt % polyethersulfone is investigated. A dispersion consisting of 2.026 g polyethersulfone and 6.78 g Torlon T-10 in 275 ml dimethylacetamide and 870 ml methylisobutylketone is prepared by dissolving the polymers simultaneously in dimethylacetamide at 143° C. and dispersing in methylisobutylketone at room temperature. A +40V potential is applied to silicone coated planar Ni electrodes in the dispersion for 1.5, 3 and 5 minutes, in each case resulting in a current of 0.5 mA. The electrodeposited films are each dried at 90° C. for 15 minutes and then at 214° C. for 30 minutes. The cured film thicknesses resulting from these runs are 14 μm, 34 μm and 64 μm, respectively. FIG. 3 shows a plot of the cured film thickness versus electrodeposition time indicating good linear growth of the film with time at a rate of about 14 μm/min after an induction period of about a half minute.

In order to clearly observe the polymer domains microscopically, thin films are deposited onto smooth optically transparent fluoride doped tin oxide electrodes deposited on a flat glass substrate. Various 1 μm films containing several concentrations of polyethersulfone are deposited as described above except that a silicone release agent is not applied to the tin oxide electrode, and a +20V potential is applied for one minute. Optical photomicrographs clearly show 1–2 μm irregularly shaped domains of polyethersulfone in 23 wt % polyethersulfone-77 wt % polyamideimide. An approximate 1 μm film of 50/50 % polyethersulfone-polyamideimide is similarly electrodeposited onto a tin oxide electrode. Optical microscopy indicates an interpenetrating network of polymer domains with a characteristic dimension of about 3 μm. A film approximately 1 m thick containing 23%/77% polyamideimide/polyethersulfone is also electrodeposited onto a tin oxide electrode. Optical microscopy clearly shows circularly shaped 5–7 μm polyamideimide particles in a host polyethersulfone matrix.

Figure 4:
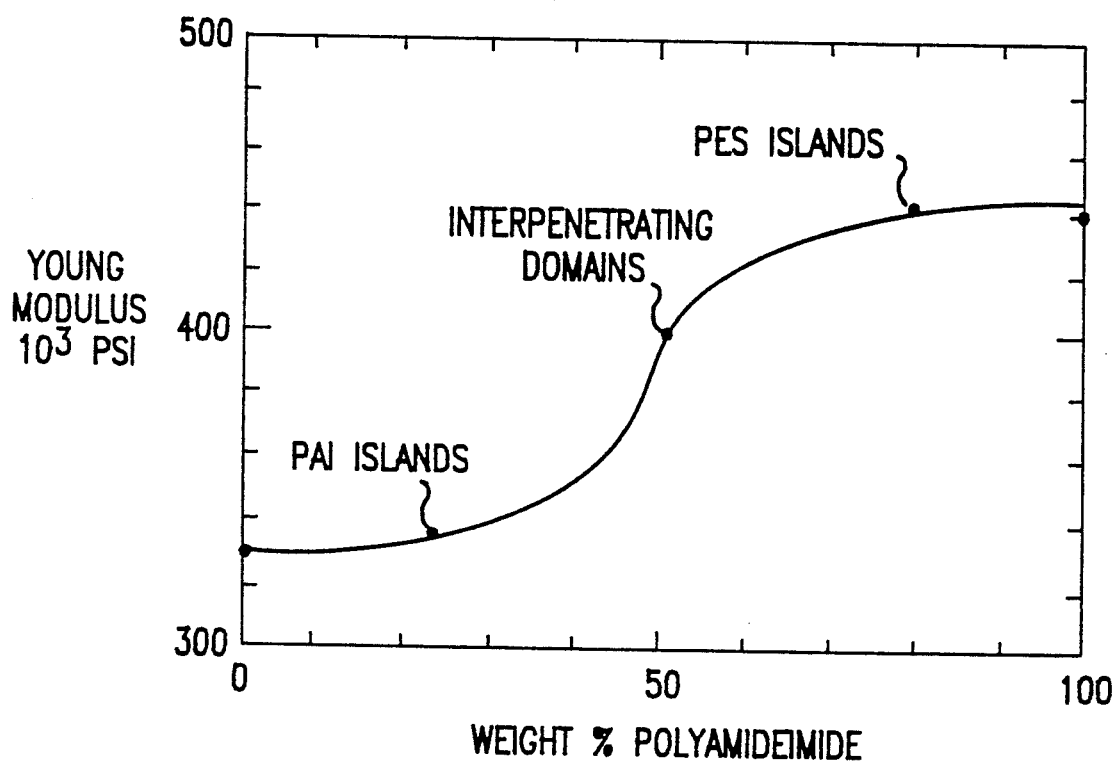
FIG. 4 is a plot of the Young's modulus of polymer films containing polyamideimide and polyethersulfone prepared by electrodeposition as a function of the concentration of polyamideimide in the dispersion.

The mechanical properties of films composed of incompatible polymer blends of polyamideimide and polyethersulfone are investigated as a function of the concentration of polyamideimide in the film. FIG. 4 shows the dependence of the Young's modulus on the concentration of polyamideimide is increased from 0 wt % (pure polyethersulfone) to 100 wt % polyamideimdie. The Young's modulus increases sigmoidally with an inflection point near 50 wt % polyamideimide. Thus it is possible to tailor the Young's modulus of the seamless belt by adjusting the composition of the film, i.e. the ratio of polyethersulfone to polyamideimide. In addition it is desirable to be able to mix small quantities of a guest polymer into a host polymer to introduce the properties of the guest polymer without changing the mechanical properties of the host polymer. FIG. 4 shows that this can be done. For example, it is possible to introduce approximately 30 wt % polyethersulfone into a host polyamideimide matrix without significantly affecting the Young's modulus of the film.

Figure 5:
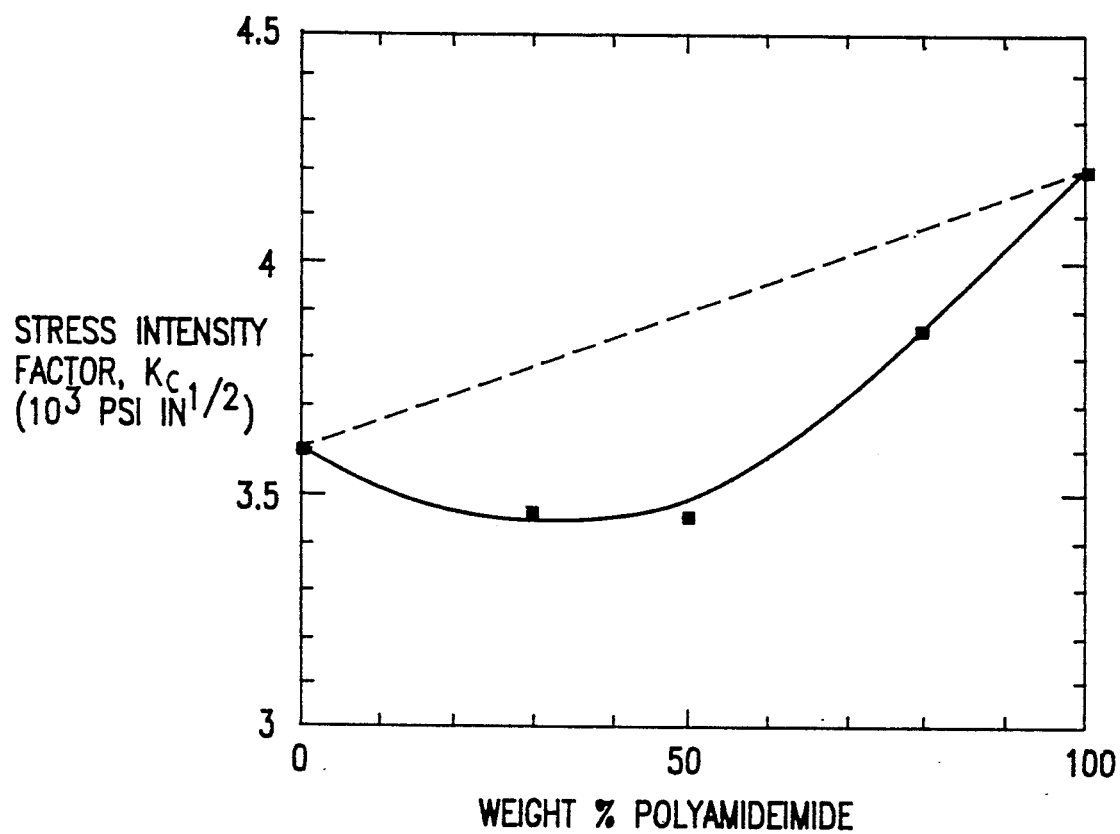
FIG. 5 is a plot of stress intensity factor $K_c$ for electrodeposited films of polyamideimide and polyethersulfone as a function of the concentration of polyamideimide.

FIG. 5 shows the influence of the film composition on the ability of the film to resist crack initiation over a range of polyamideimide concentrations. The figure shows a plot of the stress intensity factor, $K_c$, a measure of the resistance of the polymer film to crack initiation from 0 to 100 % polyamideimide concentrations. The stress intensity factor for polyethersulfone is lower than that of polyamideimide as shown in FIG. 5. At low polyamideimide concentrations $K_c$ is practically independent of the concentration of polyamideimide in the film. Above 50 wt % the crack initiation resistance of polyethersulfone is improved by the addition of polyamideimide.

EXAMPLE 2

2.028 g copolyester (KODAR PETG Copolyester 6763 (ethylene-1,4-cyclohexylenedimethylene terephthalate), Eastman Kodak Co.) is dissolved in 350 ml 1-methyl-2-pyrrolidinone at 110° C. and subsequently 6.03 g Torlon T-10 is dissolved in the mixture at 130° C. No special pretreatment of the polymers is performed. The resulting mixture is then cooled to room temperature and added slowly with stirring to 840 ml butyronitrile. A bright yellow dispersion is formed and filtered through a 30 μm filter. A 3 inch diameter×3 inch tall electroformed nickel mandrel sleeve is coated with a silicone mold release agent as in Example 1. The electrodeposition apparatus is also the same as in Example 1. A potential of +44V is applied to the working electrode (relative to the counterelectrode) for 22.5 minutes. During this time a current of 6 mA flows which decreases slightly with time. The wet polymer composite polymer film is air dried for about 15 minutes then dried in air at 95° C. for 20 minutes and 160° C. for 10 minutes. An opaque, light scattering 6 mil thick film is separated from the mandrel after cooling to room temperature. Microdomains at 20–50 μm are observed microscopically.

The mechanical properties of this film were quite favorable. Table 1 shows the salient mechanical properties of this composite film. One of the key advantages is that the composite film of 25% copolyester-75% polyamideimide has the tensile strength of a 100% polyamideimide film, i.e. there is no significant difference in the Young's modulus of these films. In fact, the composite film has a significantly higher Young's modulus than the pure copolyester film. The tensile strength at break for the composite is the same as that of pure polyamideimide film and significantly better than the pure copolyester. Significantly, the breaking strain of the composite is much greater than that of the polyamideimide alone. Although the breaking strain of the copolyester is not known, it is likely to be similar to other polyesters which are known to have higher breaking strain than electrodeposited Torlon T-10. While the stress intensity factor (the resistance to crack initiation) is not improved in the composite relative to polyamideimide, the tear propagation rate is roughly 7 times slower in the copolyester-polyamideimide composite than polyamideimide which negates the effect of an initiated tear. Thus the best mechanical properties of both polymers are incorporated into the composite.

EXAMPLE 3

1.5 g polycarbonate (Makrolon) is dissolved in a small volume of methylene chloride. The solution of polycarbonate is then added to 1-methyl-2-pyrrolidinone and heated to remove methylene chloride. 6 g Torlon 4000TF is dissolved in the 1-methyl-2-pyrrolidinone mixture and the volume of 1-methyl-2-pyrrolidinone is brought up to 365 ml. The resulting mixture is cooled to room temperature and slowly added with stirring to 850 ml methyisobutylketone. Nickel mandrel sleeve preparation and apparatus are the same as described in Example 1. A constant potential of +50V is applied to the working electrode for 2 hours. A current of 7.5 mA is initially passed. This decreases to 4 mA at the end of the electrodeposition. The film is dried at 105° C. overnight and separated from the mandrel. A seamless belt 35–65 μm thick is obtained. Film uniformity is excellent circumferentially but varies longitudinally. The films are slightly light scattering. Optical microscopy shows uniform circular domains of polycarbonate (mainly 20–40 μm) in a polyamideimide matrix.

EXAMPLE 4

230 ml of a mixture (dispersion) of 12 wt % Tedlar, 78 wt % propylene carbonate and 10 wt % methanol is mixed rapidly with 20 ml of 30 g/l solution of Torlon T-10 in 1-methyl-2-pyrrolidinone. Electrodeposition is accomplished as in Example 1 at a potential of 20 V for 2 minutes. A very viscous yellow dispersion of Tedlar (host polymer) and Torlon T-10 guest polymer results. Electrodeposition of Torlon and Tedlar occurs at the cathode. The solvent wet film is cured by heating for 20 minutes at 180° C. in an open atmosphere. The resultant film is separated from the Ni mandrel and is optically clear. Microscopy indicates that the Torlon microdomains are 50 μm in diameter. The obtained thickness is 3.8 mils.

EXAMPLE 5

A dispersion containing 50 wt % Torlon T-10 polyamideimide and 50 wt % poly(imide)-co-poly(siloxane), a proprietary block copolymer obtained from the General Electric Co., is prepared by mixing a dispersion of the two individual polymers. 3.0 g of the block copolymer is dissolved in 100 ml N-methylpyrrolidinone and is added with stirring to 300 ml acetonitrile. A stable milky white dispersion is obtained. A dispersion of Torlon T-10 is then prepared by dissolving 9.0 g Torlon in 380 ml 1-methyl-2-pyrrolidinone at >100° C. and adding the mixture to 1100 ml acetonitrile. A stable bright yellow dispersion results. One part of the block copolymer dispersion is mixed with three parts by volume of the Torlon dispersion resulting in a dispersion containing 70 wt % Torlon-30 wt % block copolymer and 25 vol. % 1-methyl-2-pyrrolidinone. The electrophoretic deposition of the block copolymer and Torlon is effected at 40 V for 20 minutes with an

TABLE 1

| Polymer Film | Young's Modulus ($10^5$ psi) | Tensile Strength ($10^3$ psi) | Breaking Strain (%) | Stress Intensity Factor, $K_c$ | Tear Propagation (inch/sec) |
|---|---|---|---|---|---|
| Polyamideimide | 4.2 | 12.0 | 9–30 | 4.1 | 1.2 |
| Kodar | 2.5 | 7.3 | — | — | — |
| 25% Kodar-75% Polyamideimine | 4.1 | 12.1 | 30–67 | 4.0 | 0.16 | initial current of 6.1 mA and a final current of 3.5 mA. A seamless belt which is uniformly 2 mil thick over most of the mandrel is parted from the mandrel. The belt is translucent. Optical microscopy clearly shows 5-10 μm domains of the copolymer in the polyamideimide host matrix.

While the invention has been described with reference to particular preferred embodiments, the invention is not limited to the specific examples given, and other embodiments and modifications can be made by those skilled in the art without departing from the spirit and scope of the invention.

What is claimed is:

1. A polymer film comprising a microheterogeneous blend of at least two thermoplastic polymers, the film being comprised of micro-domains of a guest polymer dispersed in a host polymer, and being produced by electrodepositing a dispersion of charged particles of said guest polymer and said host polymer, said dispersion being formed without a nitrogen-containing base.

2. The polymer film of claim 1, wherein said film is a seamless belt.

3. The polymer film of claim 1, wherein said polymers of said microheterogeneous blend are incompatible polymers.

4. The polymer film of claim 1, wherein said microdomains of said guest polymer have a particle size less than about 50 micrometers.

5. The polymer film of claim 1, wherein said polymers of said microheterogeneous blend are selected from the group consisting of polyamideimide, polyethersulfone, polyester, polyvinylfluoride, polyvinylidene fluoride and polycarbonate.

6. The polymer film of claim 1, wherein said film is a layer in an imaging member.

7. An electrophotographic imaging member, comprising a polymer film comprising of a microheterogeneous blend of at least two thermoplastic polymers, the film being comprised of micro-domains of a guest polymer dispersed in a host polymer, and being produced by electrodepositing a dispersion of charged particles of said guest polymer and said host polymer, said dispersion being formed without a nitrogen-containing base.

* * * * *